United States Patent
Shiue et al.

(10) Patent No.: US 7,186,473 B2
(45) Date of Patent: Mar. 6, 2007

(54) BATTERY WITH BUILT-IN LOAD LEVELING

(75) Inventors: Lih-Ren Shiue, Hsinchu (TW); Abel Sun, Taipei (TW); Hsing-Chen Chung, Hsinchu (TW)

(73) Assignee: Luxon Energy Devices Corporation, Taipei (TW)

( * ) Notice: Subject to any disclaimer, the term of this patent is extended or adjusted under 35 U.S.C. 154(b) by 462 days.

(21) Appl. No.: 10/064,830

(22) Filed: Aug. 21, 2002

(65) Prior Publication Data

US 2004/0038087 A1    Feb. 26, 2004

(51) Int. Cl.
    *H01M 14/00*    (2006.01)
(52) U.S. Cl. .................. 429/7; 320/103; 320/128; 320/135
(58) Field of Classification Search .............. 429/7, 429/8, 12; 361/503, 506; 320/103–104, 320/128, 135, 148–149
    See application file for complete search history.

(56) References Cited

U.S. PATENT DOCUMENTS

| | | | |
|---|---|---|---|
| 3,811,944 A * | 5/1974 | Liang et al. ............... 429/7 |
| 4,622,507 A | 11/1986 | Persen |
| 4,959,281 A | 9/1990 | Nishi et al. |
| 5,162,165 A | 11/1992 | Bianchi |
| 5,421,745 A * | 6/1995 | Aksoy et al. ............ 439/626 |
| 5,548,055 A * | 8/1996 | Narang et al. ............ 528/25 |
| 5,563,765 A * | 10/1996 | Lian et al. ............... 361/503 |
| 5,587,250 A * | 12/1996 | Thomas et al. ............ 429/3 |
| 5,644,207 A | 7/1997 | Lew et al. |
| 5,645,949 A | 7/1997 | Young |
| 5,930,108 A | 7/1999 | Kurzweil et al. |
| 6,020,082 A | 2/2000 | Orlando |
| 6,074,775 A * | 6/2000 | Gartstein et al. ............ 429/53 |
| 6,088,217 A | 7/2000 | Patel et al. |
| 6,163,131 A | 12/2000 | Gartstein et al. |
| 6,222,723 B1 | 4/2001 | Razoumou et al. |
| 6,252,762 B1 | 6/2001 | Amatucci |
| 6,645,663 B2 * | 11/2003 | Bean et al. ............... 429/99 |
| 2003/0134158 A1 * | 7/2003 | Kung ..................... 429/7 |

FOREIGN PATENT DOCUMENTS

JP          02273036 A   *  11/1990

* cited by examiner

*Primary Examiner*—Gregg Cantelmo
(74) *Attorney, Agent, or Firm*—J.C. Patents

(57) ABSTRACT

An integrated battery by incorporating battery elements, supercapscitors elements, and miniaturized electronic controllers within a single housing is devised. The supercapacitors provide a load leveling for the battery elements at both charging and discharging. So long as the rated working voltage of supercapacitor is complied, the capacitor can be charged with charging currents of any magnitude. Then, the energy stored in the supercapacitors can be transferred from the capacitors to the batteries resulted in fast charging and energy conservation. With load leveling provided by the supercapacitors, the batteries are set to constantly discharge at 1C or lower rates and their residual energy near the end of discharge cycle can become useful as well. Therefore, the service run time, cycle life, and energy utilization of the batteries integrated are improved. In addition, the supercapacitor can be a built-in actuator to provide powers to in-cell air management systems for generating air draft inside metal-air batteries and fuel cells to increase their shelf life and power density.

12 Claims, 6 Drawing Sheets

BATTERY WITH BUILT-IN LOAD LEVELING

BACKGROUND OF INVENTION

The present invention relates to a battery with on-board load leveling and, more particularly, to the integration of at least a battery with at least a supercapacitor and miniaturized electronic controllers within a single housing, wherein the supercapacitor provides load leveling to the battery at charging and discharging.

Batteries are indispensable in the modern life. From automobiles and cellular to lap tops and PDA"s, the devices will not perform without batteries. Batteries are generally categorized as primary batteries that offer only one time of use, and secondary batteries that can be reused through electrically recharging in a number of cycles. As chemical reactions coupled with structural alteration are involved in the energy transfer of batteries, they are all limited in the rates of charge and discharge, as well as the depth of discharge. High power density and rapid recharge-ability are thus two goals in the incessant developing endeavors for batteries.

On the contrary, although capacitors have superior power density, depth of discharge, and recharge-ability than battery for the energy transfer occur only on the electrode surface of capacitors. Nevertheless, as the bulk of electrodes is not utilized for storing energy capacitors have an inferior energy density than batteries. To improve the energy density thus becomes the major developing target for capacitors. Obviously, an ideal energy-storage device should combine the advantageous qualities of both batteries and capacitors. Just like lead acid battery has the greatest power density among commonly used batteries including Ni—Cd, Ni—MH, Li, and Zn—air, supercapacitor has the highest volumetric energy density among all capacitors including ceramic, plastic film, aluminum electrolytic, tantalum, glass, and mica capacitors. Because of its high energy content, supercapacitor is capable of delivering and receiving currents up to hundreds of Ampere that impart the capacitor practical values to provide load leveling to batteries and fuel cells for power applications.

It is a paradox for an energy-storage device to simultaneously possess both of high energy density and high power density. As high energy density requires thick electrodes, whereas thin electrodes are needed for high power density. The device can be achieved only when a material with nanometer dimensions and a high energy capacity together with an implementing method, which can exactly convert the material into electrodes without losing the distinctive characters of the material, can be established. Otherwise the ideal energy-storage device is hardly attainable. While enthusiastic endeavors are dedicated to the discovery of the aforementioned material and method, there are hybrid designs proclaimed for enhancing the energy capacity and/or the energy efficiency of batteries and capacitors. In U.S. Pat. Nos. 4,959,281, 6,088,217, 6,222,723, and 6,252,762, also reports by Drews et al. "High-rate lithium/manganese dioxide batteries; the double cell concept", J. Power Sources, vol. 65, pp 129–132, 1997, and by Arbizzani et al., "New trends in electrochemical supercapacitors", J. Power Sources, vol. 100, pp 164–170, 2001, as well as by Pasquier et al. "A Nonaqueous Asymmetric Hybrid $Li_4Ti_5O_{12}$/Poly (fluorophenylthiophene) Energy Storage Device", J. Electrochem. Soc., vol. 149, no. 3, pp A302–A306, 2002, wherein a battery electrode is used as anode and a supercapacitor electrode as cathode to construct hybrid devices. By properly selecting the hybrid pairs, it is said that the energy density of an asymmetric supercapacitor is increased by six times as stated in U.S. Pat. No. 6,222,723. Even with 10-fold augmentation in the energy density of supercapacitor, its energy content is still tiny in comparison to that stored in batteries. In addition, neither the battery electrode can be protected against over-charge and over-discharge by the capacitor electrode, nor can the capacitor electrode completely utilize all the increased energy for providing peak currents as the reaction on the battery electrode is slow as usual. There is no practical gain in the asymmetric devices.

It is known in the art that batteries should have protection mechanisms and electronic circuits against high internal pressure, run-away temperature, inverse polarity, over-charge, and over-discharge. Normally, batteries and their protection means are two separate identities in different packages. However, for fast and precise performance, mechanics and electronics are now being integrated into a single device known as mechatronics that can be found in products such as computer disk drive, dryer, air bag, CD/DVD player, and automobile braking system. Such concept has been applied to the construction of integrated batteries as well. U.S. Pat. Nos. 4,622,507, 5,644,207, 5,645,949, 6,020,082 and 6,163,131 all disclose the integration of batteries with control circuits in a single housing. They are incorporated herein by references in their entirety. By placing the controllers by the batteries within a single casing can provide a number of advantages including fewer connecting cables used, close monitoring, EMI (electromagnetic interference) shielding, and real-time response. An electronic controller should modulate at least the following four key functions of batteries: 1) use time, 2) power output, 3)recharge time, and 4)safety. The first two functions relate to the discharge of batteries on driving various loads. U.S. Pat. No. 6,163,131 has allocated one-quarter of its entire content to a discharge sub-controller wherein the energy utilization of batteries is enhanced via safe deeper discharge. In essence, using electronic controllers alone for improving the qualities of batteries is a passive approach. Though the electronic controllers can protect the batteries from damages due to excessive charge and discharge, the circuits merely regulate and guide the batteries to execute energy transfer under some predetermined levels. On one hand, the controllers contain no energy to help batteries to meet great power demands, on the other the controllers can not assist batteries to receive large energy as generated in the regenerative braking of electrical vehicles. The controllers just block excessive energies instead of retrieval. To provide a realtime load leveling and to save all available energies, the present invention integrate batteries, supercapacitors and electronic controllers within a single housing.

SUMMARY OF INVENTION

The invention provides a supercapacitor, which is an energy storage device with the same electric characteristics as capacitor, and yet it stores much more energy than the conventional capacitors. As long as the rated voltage of capacitor is complied, supercapacitor can accept charging currents of any magnitude and store the energy quickly. On releasing the stored energy, supercapacitor can robustly deliver peak currents with tens thousands of cycle-life and more than 99% depth of discharge. Therefore, supercapacitor is energetic and reliable for power applications, and it is a universal element for actively improving the energy qualities of batteries and fuel cells.

In accordance with the unique properties of supercapacitor, an object of the invention is to use the capacitor as an in-cell load leveling element for batteries and fuel cells. Regardless of the load demands, the batteries integrated are set to discharge at 1C or lower rates, and the supercapacitor will provide the extra power needs. As the batteries always discharge at low currents, their use time and lifetime will be extended.

Another object of the invention is to increase the utilization of the allowable energy stored in batteries. Near the end of the discharge cycle of batteries, their residual energy is often insufficient to drive many loads. However, the residual energy can become potent and useful after being boosted by supercapacitor. With the assistance of supercapacitor, the residual energy of batteries is safely drained.

Yet another object of the invention is to use supercapacitor as a buffer or equalizer for the electrical charging of batteries. The capacitor is first charged by external power sources that provide miscellaneous charging currents at voltages below the nominal operating potential of capacitor, then the capacitor transfers its stored energy to the batteries following the charging protocols of batteries. By the foregoing algorithm, all available energies are saved, batteries are protected from excessive charging currents, and battery charging is expedited because of energy equalization provided by supercapacitor.

Still another object of the invention is to simplify the controlling or protecting circuits of batteries by using supercapacitor for energy management. Supercapacitor performs both as an energy device and an electronic component. Because of moderately high energy density and high power density of supercapacitor, some DC-DC converters and step-up circuits can be saved or minimized.

A further object of the invention is the incorporation of battery and supercapacitor within a single housing. Since both devices share a number of similarities in the electrolyte system and in manufacturing procedures and equipments, they are easy to be made in one package without the problem of cross contamination. Combining the strength of the battery and supercapacitor, the hybrid device attains a synergistic effect as the two elements are electrically integrated.

A still further object of the invention is provision of powers to actuate micro fans installed inside metal-air batteries, or to turn on a heating element in fuel cells such as proton exchange fuel cell (PEFC), for initiating the operation of the air-driven energy apparatus. Both apparatus can attain longer use time and higher power density with the assistance of load leveling provided by supercapacitor.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

An integrated battery is a smart battery that has on-board electronic circuits and complementary devices to allow the battery taking heavy-duty loads without over-discharge or over-charge. Battery and supercapacitor are electrochemical cells for storing energy in different mechanisms. Bulk chemical reactions are evolved in battery wherein electrical energy is converted to chemical energy at charging, and the reverse process occurs at discharge. In contrary, the energy transfer at charge and discharge of supercapacitor is more a physical process than a chemical reaction. Regardless of the mechanistic difference, batteries and supercapacitors can be manufactured using the same production procedures and equipments. However, supercapacitors can use identical electrodes as anode and cathode, their fabrication is more flexible and economical than that of batteries. The latter must use asymmetric electrodes. As both devices can use the same electrolyte system, it is easy to integrate battery and supercapacitor into a single device. Inclusion of supercapacitors adds no significant increment to the production cost of batteries.

Figure 1:
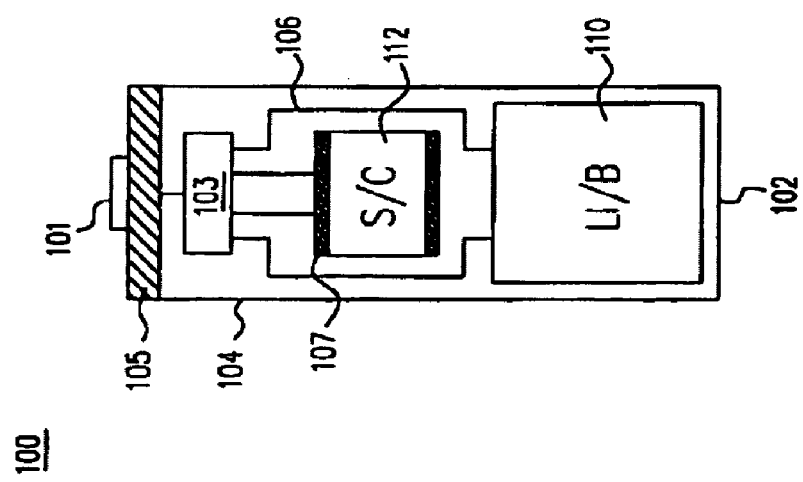
FIG. 1 is a cylindrical integrated-battery containing battery, supercapacitor, and microprocessor within a single housing, according to one preferred embodiment of this invention.

FIG. 1 shows one preferred embodiment of incorporating rechargeable battery element LI/B 110, supercapacitor element S/C 112, and microprocessor 103 within a single housing of cylindrical shape 104 to form the integrated battery 100. There are four communication buses, 106, two for each element, between microprocessor 103 and rechargeable battery LI/B 110, as well as between 103 and supercapacitor S/C 112. Battery 100 has positive and negative terminals indicated by 101 and 102, respectively, on the exterior of housing 104. The communication bus 106 allows LI/B 110 and S/C 112 to perform complementary actions to each other through microprocessor 103, while insulator 105 provides hermetic seal to the components within the housing 104. Both ends of supercapacitor S/C 112 are further sealed with an edge sealer 107 so that S/C 112 can be bipolar and isolated from other components in the housing. A bipolar design has at least three electrodes with the middle one serving as anode and cathode simultaneously. As a matter of fact, a bipolar cell is a device that contains two cells or more in series connection without connecting cables. The open cell voltage of a bipolar cell is the sum of the voltages of cells constituting the bipolar device. Nevertheless, the electrolyte must remain in each cell and that is the main reason why edge sealer 107 is used. The dimension and capacity of supercapacitor S/C 112 relative to that of rechargeable battery LI/B 110 can be custom-made according to application needs.

Practically, all electrolytes employed for batteries or fuel cells are applicable to supercapacitor. For example, electrolytes (in parenthesis) for primary batteries such as $Zn/MnO_2$ (KOH), $Zn/Ag_2O$(KOH), and Zn/air (KOH), electrolytes for secondary batteries as in lead-acid ($H_2SO_4$), nickel-cadmium (KOH), nickel-metal hydride (KOH) and lithium ion (salt in organic solvent such as propylene carbonate (PC)), polymeric electrolyte in lithium polymer batteries, also electrolyte for PEFC ($H_3PO_4$), all have been proved to work for supercapacitor. Particularly, PC, a frequently utilized solvent for lithium ion batteries, is also a common solvent for supercapacitor. Other suitable solvents, for example, can be used for both battery and supercapacitor include acetonitrile, ethylene carbonate, diethyl carbonate, and dimethyl carbonate. Though $LiPF_6$ is the common salt for Li ion batteries and $(C_2H_5)_4NBF_4$ for supercapacitors, it is the solvent that causes cross contamination. In other words, battery LI/B 110 and supercapacitor S/C 112 in FIG. 1 are truly compatible. When S/C 112 is a bipolar device composing of three electrodes and an organic electrolyte, it will have a nominal working potential of 5V that is close to the open circuit voltage of lithium ion batteries, that is 4.2V. As a matter of fact, the cell voltage of supercapacitor can be made to match that of battery via bipolar configuration in small volume.

In another preferred embodiment, the integration of battery and supercapacitor is by stacking the electrode plates of both devices into a housing or a package of prismatic shape. Not only the stacking arrangement provides easier cell assembly than spiral winding as shown in FIG. 1, it also allows multi-cell battery and multi-cell supercapacitor to be gathered within a single housing. There are four kinds of material for constructing the electrodes of supercapacitor : 1)carbons, 2)metal oxides, 3)conductive polymers, and 4) a composite in various combinations of the foregoing three. With different materials as the active layer of electrodes, the resulting capacitors will have different electrical characteristics. Hence, supercapacitor, ultracapacitor, and electric double layer capacitor are the most common names given to the high-capacity ($\geq 0.15 F/cm^2$) capacitors ad hoc. Except the conducting polymer, the present invention has tested the other three on providing load leveling to batteries, and the results are satisfactory. It is primarily the cost of material and fabrication that decides which active material should be utilized to implement the invention.

Figure 2:
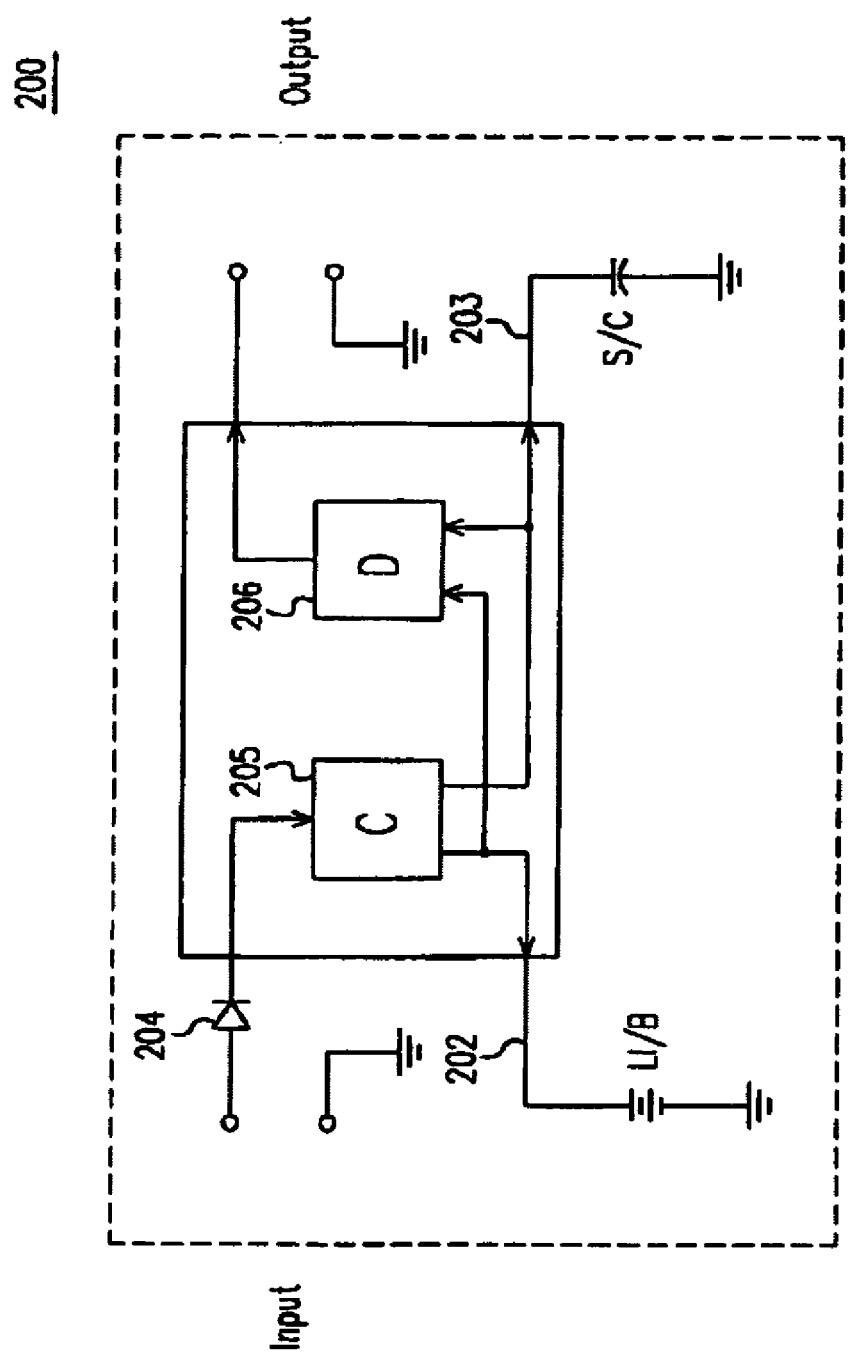
FIG. 2 is a simplified diagram showing battery and supercapacitor are connected in parallel by a charge sub-controller and a discharge sub-controller, according to one preferred embodiment of this invention.

In addition to the cost of supercapacitor related to the commercial viability of the integrated battery of the present invention, the price of the enclosed electronic controller is also a critical factor. FIG. 2 is a preferred embodiment showing a block diagram of an on-board controller 200 for guiding the compensatory actions between battery LI/B 110 and supercapacitor S/C 112. Inside the housing 201, the controller is consisted of a charge sub-controller (C) 205 and a discharge sub-controller (D) 206 for governing energy supplied through diode 204 from an input such as an AC or a DC power source, as well as for governing energy output to loads. When there is no external energy, battery LI/B provides energy with voltage adjustment, for example, 4.2V or lower is stepped up to 5.0V, by the charge sub-controller C through communication bus 202 and 203 to charge supercapacitor S/C. Battery LI/B is pry-set to discharge at no more than 1 C. 1 C rate means that the allowable energy of batteries is drained in 1 hour. If there exists a power difference between a power demanded by a load and that provided by the LI/B, it can be supplemented by a provision of supercapacitor S/C via the modulation of discharge sub-controller D.

Figure 2A:
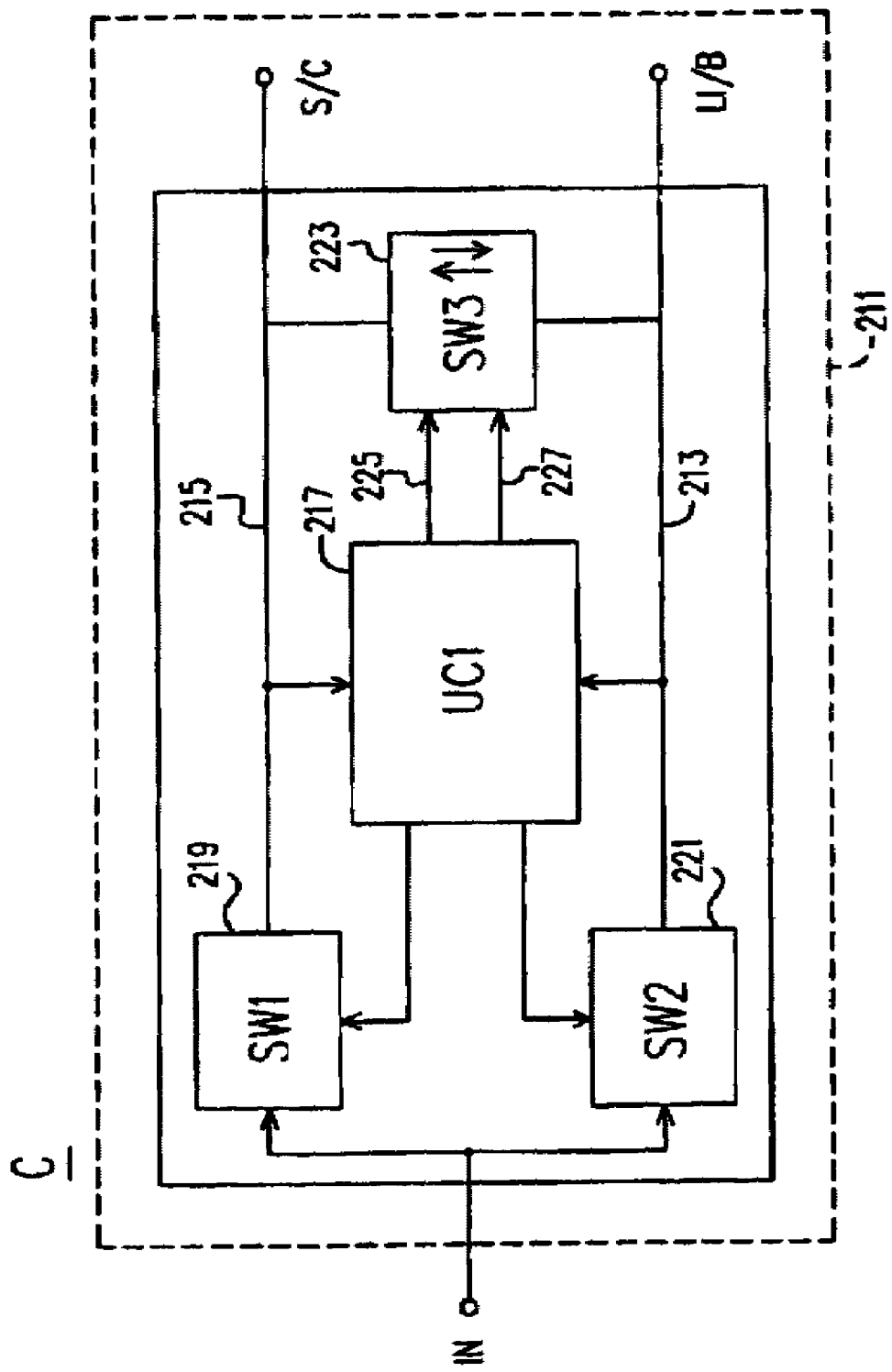
FIG. 2A elaborates the circuitry of charge sub-controller that regulates the electrical charging of battery and supercapacitor, according to one preferred embodiment of this invention.
Figure 2B:
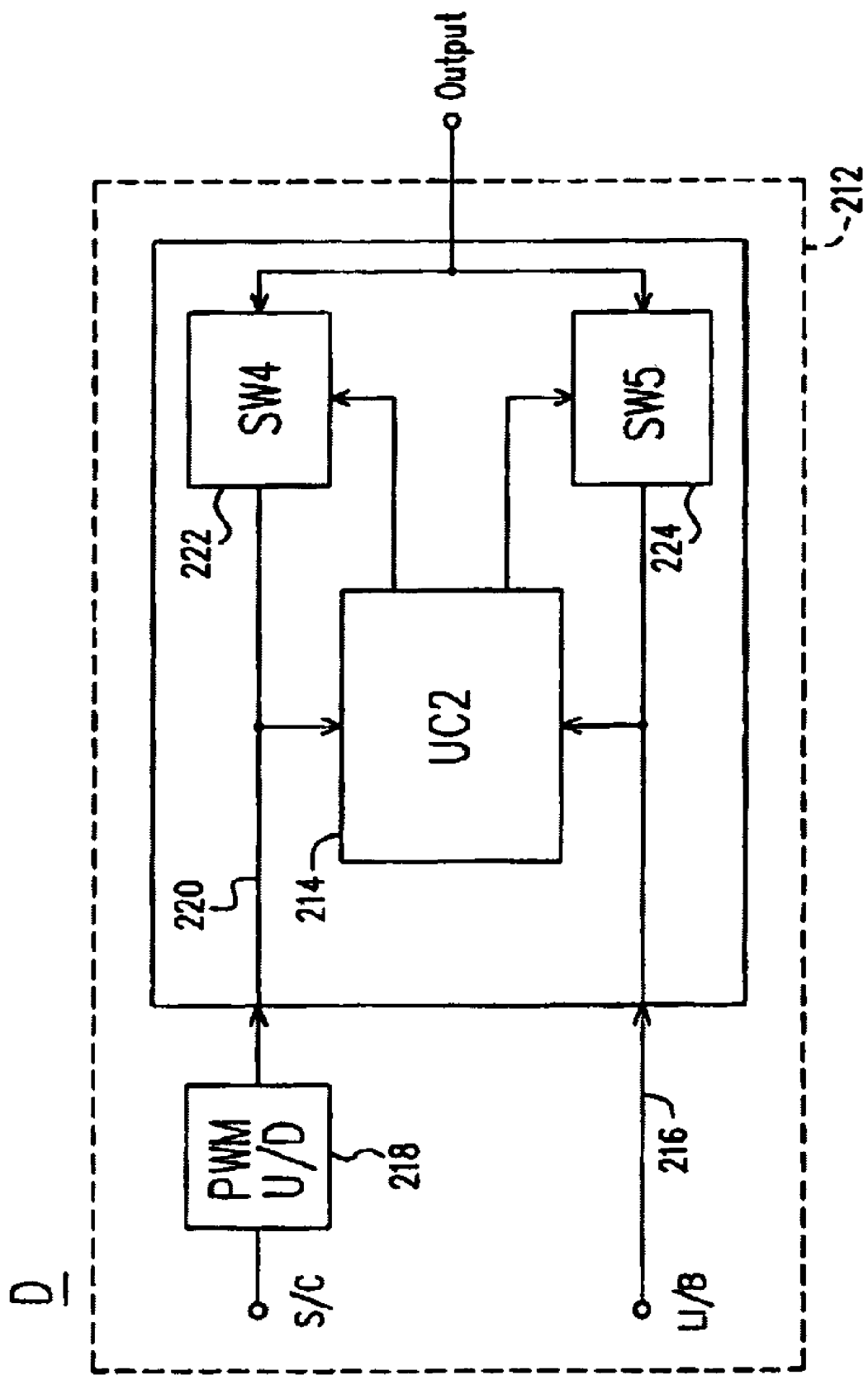
FIG. 2B elaborates the circuitry of discharge sub-controller that governs the energy output provided collectively by battery and supercapacitor, according to one preferred embodiment of this invention.

Now, the topology of charge sub-controller C and discharge sub-controller D is explained in FIGS. 2A and 2B, respectively. FIG. 2A shows charge sub-controller C consisting of a micro-controller (µC1) denoted as 217 and three switches, SW1 (219), SW2 (221), and SW3 (223), of MOSFET (metal oxide semiconductor field effect transistor) type encased in the housing 211. During charging, a charging current is supplied by an external power source to point IN, which is regulated by micro-controller 217 through switches 219 and 221 also communication buses 215, 225, and 227 to primarily charge supercapacitor S/C 112 to its nominal cell voltage. Within the forgoing voltage, S/C 112 can accept charging currents of a magnitude up to hundreds of Ampere. Hence, even as large as the currents generated in the regenerative braking systems of trucks can be conserved and re-used by employing supercapacitor as load leveling for the integrated battery. Once S/C 112 is fully charged and battery LI/B 110 is detected low in energy content, S/C 112 will supply energy under the command of micro-controller 217 via bus 227 and bus 215, switch 223 into bus 213 to charge LI/B 110. A double arrow is included in 223 to indicate a two-way charging between S/C and LI/B. If necessary, the charging sequence will be repeated until both S/C 112 and LI/B 110 are fully charged. By then, the charge sub-controller C will automatically disconnect the integrated battery from the external power source.

Figure 3:
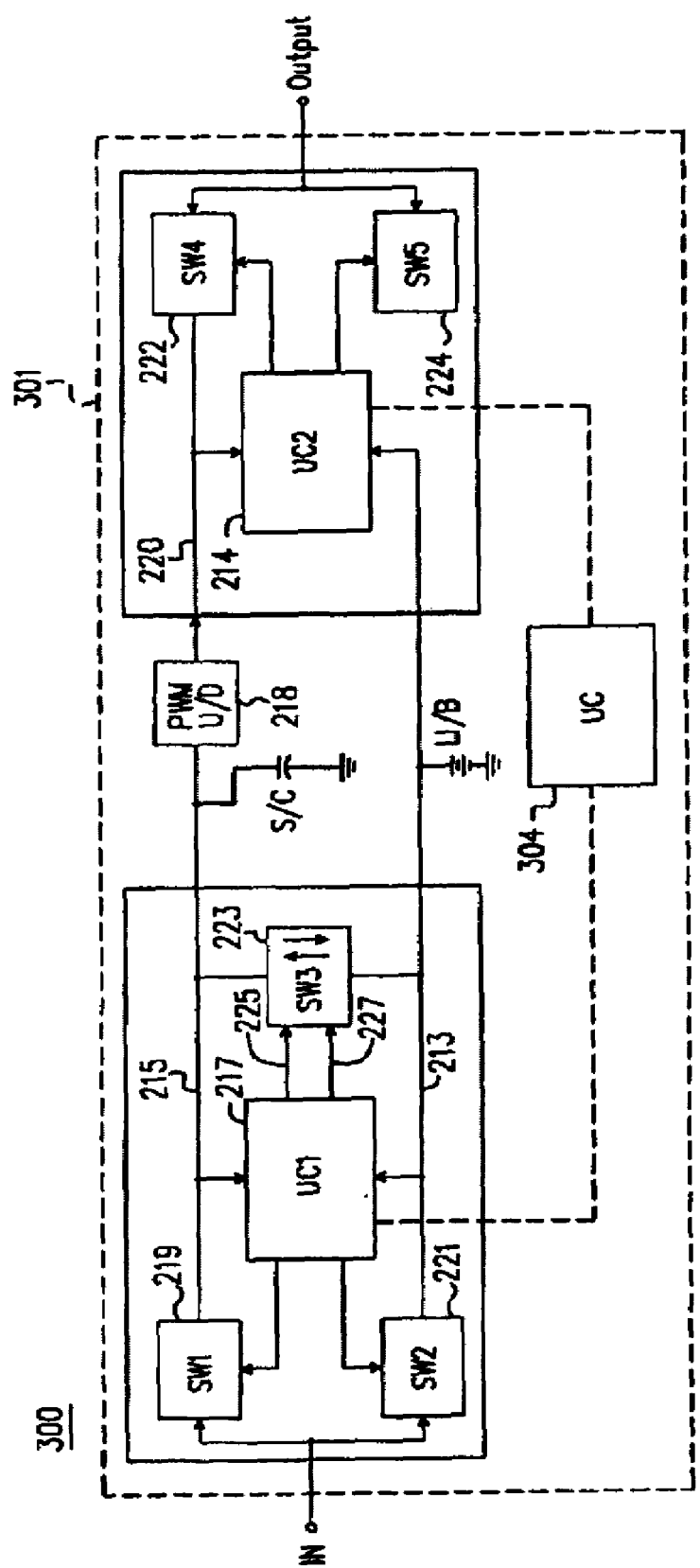
FIG. 3 is a detailed layout of the charge and discharge sub-controllers shown in FIG. 2, according to one preferred embodiment of this invention.

Next, the discharge sub-controller D is illustrated in FIG. 2B wherein a micro-controller, (µC2) or 214, and two switches, SW4 (222) and SW5 (224), of MOSFET type are utilized to regulate battery LI/B and supercapacitor S/C on providing energy to the output of housing 212. During discharging, it is LI/B that primarily supplies energy to S/C via switch 223 in FIG. 2A and loads under a total discharge rate not exceeding a predetermined level, for example, 1C. When loads demand a power more than 1C discharge rate can furnish, switches 222 and 224 will be proportionally opened at the command of micro-controller 214 according to power apportion on communication bus 216 and 220. No matter how heavy the load is, LI/B is always discharged at a safe level that does not cause significant IR drop at the battery so that the use time and cycle life of battery can be extended. Furthermore, so long as LI/B has not decayed below its cut-off voltage, the residual energy of LI/B may be converted by the PWM (pulse width modulation) 218 of S/C to accomplish some finale such as sending a message by cellular or saving data of a lap-top. By safely extracting the last bit of the battery power, the energy efficiency of LI/B is enhanced. Finally, combining charge sub-controller C and discharge sub-controller D forms the entire picture of the on-board controller 300 in the housing 301 as shown in FIG. 3. Same reference numbers as in FIGS. 2A and 2B are ensued for the identical components in FIG. 3. In essence, the two micro-controllers 217 and 214 are two constituent parts of the micro-controller 304. Two phantom lines are used to indicate the foregoing relationship in FIG. 3. Communication bus 302 and 303 are responsible for detecting cell voltages of both LI/B and S/C during charging.

Supercapacitor is utilized as a built-in load leveling for primary and secondary batteries in the above discussion. There are other important energy devices that may solve our energy need particularly in the future, for example, metal-air batteries and fuel cells. This type of apparatus can carry a large reservoir of fuel such as metal fuel or hydrogen gas, technically, they can offer an indefinite service run time.

Figure 4:
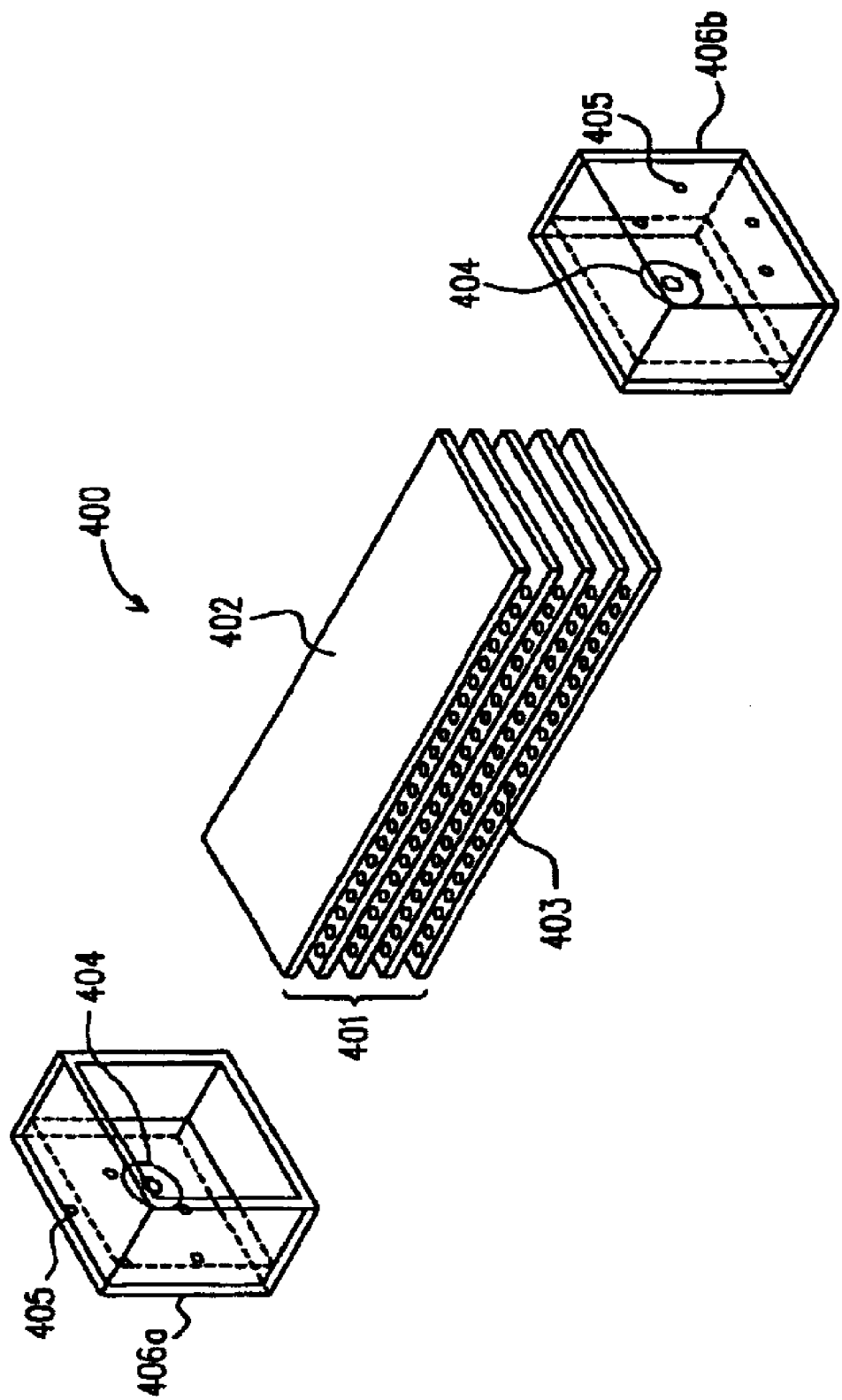
FIG. 4 is a multi-cell zinc-air battery consisting of an in-cell air management that is actuated by supercapacitor (not shown), according to one preferred embodiment of this invention.

Another unique feature of the air-driven devices is that they depend on an air cathode for their chemical reactions to generate electricity. Using air as reactant has the advantages of free material, inexhaustible source and indefinite shelf life attainable by completely closing the air intake by the devices. Nevertheless, metal-air batteries require power to resume the air flow, while fuel cells demand power for heating the various kinds of equipment to their operating temperatures. Apparently, metal-air batteries and fuel cells can be equipped with an on-board load leveling to provide the aforementioned needs. FIG. 4 shows a multi-cell zinc-air battery 400 containing an in-cell air management. As discussed above, integration of supercapacitor in the stacking arrangement is completed simply by adding the electrode plates of supercapacitor (not shown in FIG. 4) to the battery stack 401 formed by the battery plates 402. As seen in FIG. 4, a number of protruding dots are printed on spacers disposed against the (air) cathode plates to create air channels 403. There are a number of air inlets 405, as well as two micro fans or micro pumps 404, atop both caps 406a and 406b of the hybrid battery 400. It is also easy to conceal a controller as depicted by FIG. 3 inside the housing of 400 (both controller and housing are not shown in FIG. 4 for clearance).

The aforementioned micro fans 404 of FIG. 4 can be fabricated by LIGA (German acronym for Lithographe, Galvanoformung, und Abformung) technique. To make the micro fans to work, there should have a bending element and at least one force element. Several materials available for constructing the bending element that include single crystal silicon (such as silicon wafer) or an electroactive polymer (EAP) diaphragm. While the force element may be made of a piezoelectric crystal (such as zinc oxide), a magonestrictive alloy (such as terbium-dysprosium-iron), or a thermally dependent film (such as aluminum). Mechanically, the force element is attached to the bending element. When a voltage is applied to the force element, it will induce a physical change such as the length change of the element. Such change of the force element will cause the bending diaphragm to flex inward or outward depending on the location of the force element. Through the foregoing flexing motion of the bending element, an air draft will be developed through a check valve of the micro fans in the zinc-air battery 400 of FIG. 4. Air intake of the battery depends on the voltage applied to the force element. When there is enough room inside the housings of metal-air batteries or fuel cells, a micro rotary fan or blower may be used as micro fans 404 to replace the bending diaphragm for drawing air into the air-dependent devices. Regardless of which design is selected, the mechanical unit is secured at the middle region of the first cap 406a and the second cap 406b of battery 400. Furthermore, the micro fans 404 at the both ends of battery 400 are arranged to flex or rotate in opposite direction so that air draft is created in the air pathways 403. To impart high power density to metal-air batteries and fuel cells, the flow rate of air in the devices is preferably greater than 10 me/min, and the power consumption of micro fans 404 is preferably smaller than 0.5W. Supercapacitor works with a non-air cell that may be constituted by a metal anode including Zn, Al, Mg and Fe and a cathode selected from NiOOH, $MnO_2$ or $Ag_2O$ to supply the power required for actuating the micro fans. In the foregoing arrangement, supercapacitor provides a load leveling for the non-air cells so that the power output of the latter can be boosted. Similar combination of non-air cell and supercapacitor may also be encased within the housings of fuel cells to supply power to a heating element, for example, a Ni—Cr resistor or PTC, to generate the operating temperatures for driving the fuel cells.

To demonstrate the load-leveling capability of supercapacitor, the following example is provided.

EXAMPLE

A multi-cell alkaline battery using Zn metal as anode, $MnO_2$ as cathode and an aqueous KOH solution as electrolyte is constructed to have an open-circuit voltage of 9V and 1.5 Ah capacity. Then, two supercapacitors, which use $Fe_3O_4$/carbon composite as active material for the electrodes and aqueous KOH solution as electrolyte, connected in parallel with each piece having an open circuit voltage of 7.5V, 6F capacitance, and 40 m ΩESR (equivalent series resistance) are provided for being integrated with the alkaline battery and an electronic controller within a single container. Right at the moment of power demand, the controller can convert the supercapacitors into series connection. It is measured that the hybrid device is capable of providing a peak power of 15V×25A or 375W that is good enough for driving various power tools. Without the supercapacitor, the alkaline battery can only deliver 13.5W (9V× 1.5A) at 1C discharge rate. Clearly, the supercapacitor has boosted the power output of the battery by 27 times. The load leveling furnished to the battery by the supercapacitors is evident and practical.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

The invention claimed is:

1. A battery with built-in load leveling, comprising:
 a rechargeable battery element, used as a primary energy supplier when the battery discharges;
 a capacitor element, selected from the group consisting of supercapacitor, ultracapacitor, and electric double layer capacitor;
 an electronic controller for controlling a two-way charging of complementary charge and complementary discharge between said battery element and said capacitor element;
 a single housing to adapt said battery element, said capacitor element, and said controller to provide a hermetic encapsulation; and
 two terminals by one positive terminal and one negative terminal, on the exterior of said housing for charging and for discharging.

2. The battery with built-in load leveling as claim 1, wherein said rechargeable battery element includes a primary electrochemical cell selected from the group consisting of $Zn/MnO_2$, $Zn/Ag_2O$, and Zn-air batteries.

3. The battery with built-in load leveling as claim 1, wherein said rechargeable battery element includes a rechargeable electrochemical cell selected from the group consisting of lead-acid, nickel-cadmium, nickel-metal hydride, lithium ion, and lithium polymer batteries.

4. The battery with built-in load leveling as claim 1, wherein said capacitor element has an energy density of 0.15F per 1 $cm^2$ of electrode area or greater than 0.15 $F/cm^2$.

5. The battery with built-in load leveling as claim 1, wherein said rechargeable battery element and said capacitor element both use the same aqueous electrolyte including one salt selected from the group consisting of KOH, NaOH, $H_2SO_4$, and $H_3PO_4$ dissolved in water.

6. The battery with built-in load leveling as claim 1, wherein said rechargeable battery element and said capacitor element both use the same organic solvent selected from the group consisting of acetonitrile, propylene carbonate, ethylene carbonate, diethyl carbonate, and dimethyl carbonate.

7. The battery with built-in load leveling as claim 1, wherein said rechargeable battery element and said capacitor element both use a polymeric electrolyte.

8. The battery with built-in load leveling as claim 1, wherein said controller regulates said rechargeable battery element to discharge at 1 C or a lower rate.

9. The battery with built-in load leveling as claim 1, wherein said controller regulates said capacitor element to provide a power difference between a load demand and a power provided by said rechargeable battery element.

10. The battery with built-in load leveling as claim 1, wherein said controller regulates said capacitor element to extract stored energy of said rechargeable battery element until its voltage is not decayed below its cut-off voltage.

11. The battery with built-in load leveling as claim 1, wherein said controller regulates said capacitor element to receive a charging current of a magnitude up to hundreds of Ampere without exceeding an open cell voltage of said capacitor element.

12. The battery with built-in load leveling as claim 1, wherein while in a charging mode, said controller repeats a two-way charging sequence between said capacitor element and said rechargeable battery element until they are fully charged.

* * * * *